(12) United States Patent
Lise et al.

(10) Patent No.: US 12,053,733 B2
(45) Date of Patent: Aug. 6, 2024

(54) PLEATED AIR FILTER WITH REINFORCING FILAMENTS COMPRISING LOCALLY-THINNED BENDING ZONES

(71) Applicant: 3M INNOVATIVE PROPERTIES COMPANY, St. Paul, MN (US)

(72) Inventors: Jonathan M. Lise, Woodbury, MN (US); Glen O. Gregerson, Hudson, WI (US); Dennis M. Glass, Cottage Grove, MN (US); Brenda K. Balderas, Lake Elmo, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 750 days.

(21) Appl. No.: 17/263,879

(22) PCT Filed: Jul. 30, 2019

(86) PCT No.: PCT/IB2019/056511
§ 371 (c)(1),
(2) Date: Jan. 27, 2021

(87) PCT Pub. No.: WO2020/026152
PCT Pub. Date: Feb. 6, 2020

(65) Prior Publication Data
US 2021/0229023 A1 Jul. 29, 2021

Related U.S. Application Data

(60) Provisional application No. 62/714,186, filed on Aug. 3, 2018.

(51) Int. Cl.
*B01D 46/52* (2006.01)
*B01D 39/16* (2006.01)
*B01D 46/00* (2022.01)

(52) U.S. Cl.
CPC ......... *B01D 46/523* (2013.01); *B01D 39/163* (2013.01); *B01D 46/0001* (2013.01);
(Continued)

(58) Field of Classification Search
None
See application file for complete search history.

(56) References Cited

U.S. PATENT DOCUMENTS

RE30,782 E 10/1981 Van
4,813,948 A 3/1989 Insley
(Continued)

FOREIGN PATENT DOCUMENTS

CN 206184173 5/2017
EP 1034024 4/2002
(Continued)

OTHER PUBLICATIONS

International Search Report for PCT International Application No. PCT/IB2019/056511, mailed on Nov. 19, 2019, 3 pages.

*Primary Examiner* — Jason M Greene
(74) *Attorney, Agent, or Firm* — Kenneth B. Wood

(57) ABSTRACT

A pleated air filter media with a plurality of continuous-contact reinforcing filaments on at least one face of the pleated air filter. The filaments have locally-thinned bending zones each of which is registered with pleat tip or pleat valley of the pleated air filter media.

19 Claims, 7 Drawing Sheets

(52) U.S. Cl.
CPC ..... *B01D 46/0005* (2013.01); *B01D 46/0032* (2013.01); *B01D 2239/0435* (2013.01); *B01D 2239/0618* (2013.01); *B01D 2239/10* (2013.01); *B01D 2265/04* (2013.01); *B01D 2265/06* (2013.01); *B01D 2275/50* (2013.01)

(56) References Cited

U.S. PATENT DOCUMENTS

| | | |
|---|---|---|
| 4,976,677 A | 12/1990 | Siversson |
| 5,035,240 A | 7/1991 | Braun et al. |
| 5,230,800 A | 7/1993 | Nelson |
| 5,256,231 A | 10/1993 | Gorman et al. |
| 5,389,175 A | 2/1995 | Wenz |
| 5,662,728 A | 9/1997 | Groeger |
| 5,753,343 A | 5/1998 | Braun |
| 6,365,088 B1 | 4/2002 | Knight et al. |
| 6,740,137 B2 | 5/2004 | Kubokawa et al. |
| 6,858,297 B1 | 2/2005 | Shah et al. |
| 7,235,115 B2 | 6/2007 | Duffy |
| 7,858,163 B2 | 12/2010 | Angadjivand et al. |
| 7,959,699 B2 | 6/2011 | Privitt et al. |
| 8,162,153 B2 | 4/2012 | Fox |
| 8,231,700 B2 | 7/2012 | Sundet |
| 8,240,484 B2 | 8/2012 | Fox et al. |
| 8,419,817 B2 | 4/2013 | Sundet |
| 8,685,129 B2 | 4/2014 | Lise |
| 8,834,611 B1 | 9/2014 | Dimicelli |
| 9,174,159 B2 | 11/2015 | Sanocki |
| 9,278,301 B2 | 3/2016 | Fox |
| 9,808,753 B2 | 11/2017 | Lise |
| 9,976,771 B2 | 5/2018 | Chen |
| 2004/0011204 A1 | 1/2004 | Both |
| 2007/0180803 A1 | 8/2007 | Sundet |
| 2008/0038976 A1 | 2/2008 | Berrigan |
| 2010/0326028 A1 | 12/2010 | Sundet |
| 2011/0000845 A1 | 1/2011 | Fox et al. |
| 2011/0114555 A1* | 5/2011 | Coulson ............. B01D 39/1623 427/490 |
| 2012/0017910 A1 | 1/2012 | Li et al. |
| 2013/0101477 A1 | 4/2013 | Both et al. |
| 2015/0047507 A1 | 2/2015 | Fox et al. |
| 2016/0288025 A1 | 10/2016 | Whitlock |
| 2017/0001138 A1* | 1/2017 | Grad ................... B01D 46/523 |
| 2017/0252590 A1 | 9/2017 | Angadjivand |
| 2018/0021716 A1 | 1/2018 | Li et al. |
| 2018/0056226 A1* | 3/2018 | Buettner, III ........ B01D 46/523 |

FOREIGN PATENT DOCUMENTS

| | | |
|---|---|---|
| WO | WO 2017-213926 | 12/2017 |
| WO | 2020026152 A1 | 2/2020 |
| WO | WO 2020-024245 | 2/2020 |
| WO | WO 2020-026062 | 2/2020 |

* cited by examiner

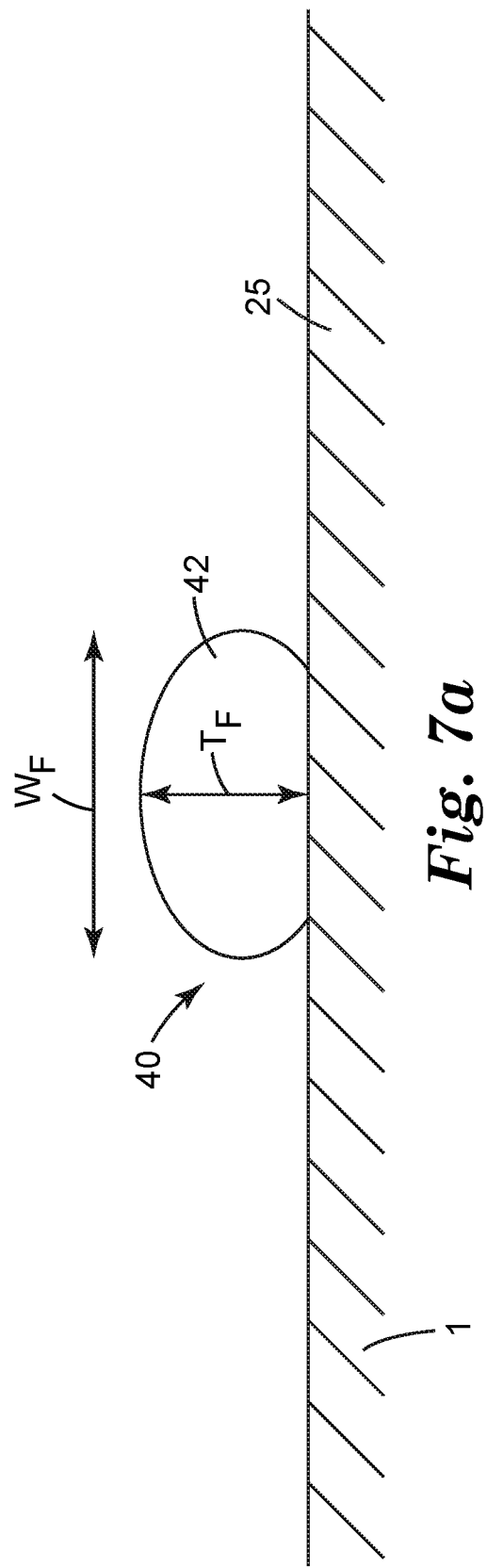
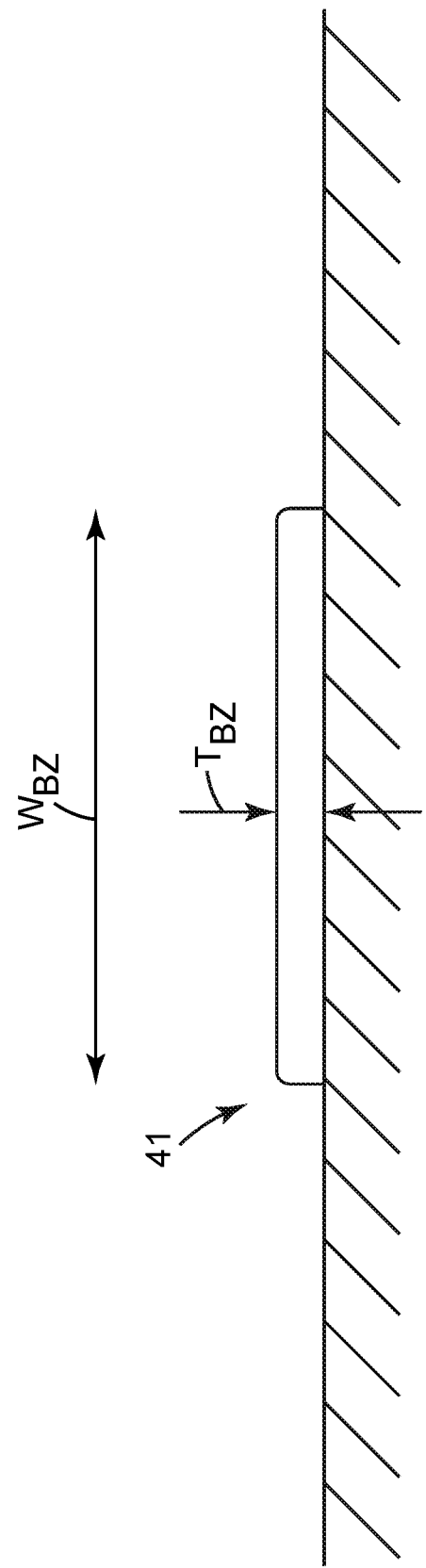

US 12,053,733 B2

PLEATED AIR FILTER WITH REINFORCING FILAMENTS COMPRISING LOCALLY-THINNED BENDING ZONES

BACKGROUND

Pleated filters are commonly used in air filtration applications, e.g. in heating-ventilating-air conditioning (HVAC) systems, room air purifiers, and so on.

SUMMARY

Herein is disclosed a pleated air filter media comprising a plurality of continuous-contact reinforcing filaments on at least one face of the pleated air filter. The filaments comprise locally-thinned bending zones, each of which is registered with a pleat tip or pleat valley of the pleated air filter media. These and other aspects of the invention will be apparent from the detailed description below. In no event, however, should this broad summary be construed to limit the claimable subject matter, whether such subject matter is presented in claims in the application as initially filed or in claims that are amended or otherwise presented in prosecution.

BRIEF DESCRIPTION OF THE DRAWINGS

FIG. 7a is a cross-sectional slice view of another exemplary continuous-contact reinforcing filament, viewed along the long axis of the filament.

FIG. 7b is a cross-sectional slice view of an exemplary locally-thinned bending zone of the exemplary continuous-contact reinforcing filament of FIG. 7a, viewed along the long axis of the filament.

Like reference symbols in the various figures indicate like elements. Unless otherwise indicated, all figures and drawings in this document are not to scale and are chosen for the purpose of illustrating different embodiments of the invention. In particular the dimensions of the various components are depicted in illustrative terms only, and no relationship between the dimensions of the various components should be inferred from the drawings, unless so indicated.

Definitions

Although terms such as "top", bottom", "upper", lower", "under", "over", "front", "back", "up" and "down", and "first" and "second" may be used in this disclosure, it should be understood that those terms are used in their relative sense only unless otherwise noted. In particular, the terminology of a first side of a pleated air filter media denotes a side of the pleated air filter media bearing reinforcing filaments. In some embodiments, additional reinforcing filaments may be present on a second side as well. As used herein as a modifier to a property, attribute or relationship, the term "generally", unless otherwise specifically defined, means that the property, attribute or relationship would be readily recognizable by a person of ordinary skill but without requiring absolute precision or a perfect match (e.g., within +/−20% for quantifiable properties); the term "substantially" means to a high degree of approximation (e.g., within +/−10% for quantifiable properties) but again without requiring absolute precision or a perfect match. The term "essentially" means to a very high degree of approximation (e.g., within plus or minus 2% for quantifiable properties; it will be understood that the phrase "at least essentially" subsumes the specific case of an "exact" match. However, even an "exact" match, or any other characterization using terms such as e.g. same, equal, identical, uniform, constant, and the like, will be understood to be within the usual tolerances or measuring error applicable to the particular circumstance rather than requiring absolute precision or a perfect match. All references herein to numerical parameters (dimensions, ratios, and so on) are understood to be calculable (unless otherwise noted) by the use of average values derived from a number of measurements of the parameter.

DETAILED DESCRIPTION

Figure 1:
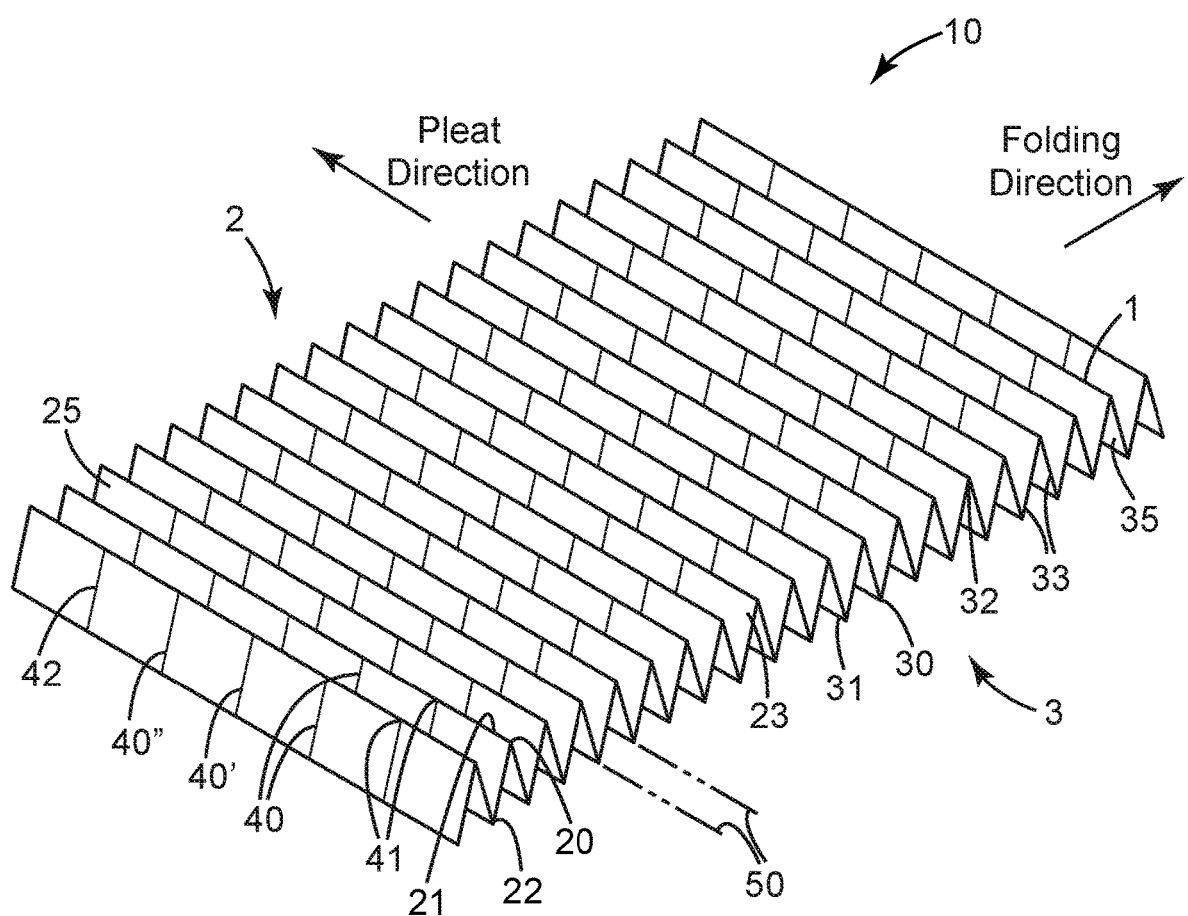
FIG. 1 is a perspective view of a first side of an exemplary pleated air filter media comprising exemplary continuous-contact reinforcing filaments on a first face of the pleated air filter media.

As shown in exemplary embodiment in FIG. 1, disclosed herein is a pleated air filter media 10 comprising a fibrous air-filtration web 1 comprising a plurality of continuous-contact reinforcing filaments 40 that are melt-bonded to a first face 25 of a first side 2 of media 10/web 1. At least some of the reinforcing filaments 40 each comprise a plurality of locally-thinned bending zones 41. Bending zones 41 are spaced along the elongate length of each filament 40 and are thus spaced along a Folding Direction of web 1. Each bending zone 41 is registered with a first-side pleat tip 21 or a first-side pleat valley 22.

As explained in detail herein, reinforcing filaments 40 are melt-bonded to the first face 25 of web 1. By "melt-bonded" is meant a filament that is bonded to fibers of a first face of a fibrous web by being generated as a molten stream of material that is contacted with the first face of the web and cooled and solidified in order to melt-bond to the first face of the web. The filaments, after being deposited on the first face 25 of web 1, are processed (e.g. while in an at least somewhat soft or semi-molten condition) to impart them with locally-thinned bending zones 41. Both the filament deposition and the processing of the filaments to form bending zones are done with web 1 in a "flat" (i.e., non-pleated) configuration (although the two steps do not necessarily have to be done in-line with each other, as discussed later herein). The bending zones 41 of the various filaments 40 are at least generally, substantially or essentially linearly aligned with each other so as to collectively define folding lines in web 1 (exemplary folding lines 50 are indicated in FIG. 1). After filaments 40 are hardened, web 1 is "gathered" (accordionized) e.g. by applying a force generally along the Folding Direction of web 1. The presence of the locally-thinned bending zones 41 will cause web 1 to preferentially fold along folding lines 50 established by the bending zones 41 acting in combination. Reinforcing filaments 40 can thus reinforce web 1 while still permitting web 1 to be folded into a pleated configuration to form pleated air filter media 10. Reinforcing filaments 40 may thus, for example, eliminate any need to equip web 1 with a reinforcing wire mesh of the type that is often used in pleated media. Furthermore, the establishing of folding lines 50 in this manner can, in at least some embodiments, eliminate any need to pre-score web 1 (i.e., before web 1 is imparted with reinforcing filaments 40) in order that web 1 can be satisfactorily pleated.

In further detail with reference to FIG. 1, exemplary pleated air filter media 10 comprises a first side 2 and a second side 3 and comprises fibrous air-filtration web 1. In some embodiments media 10 may consist essentially of web 1 (that is, web 1 may provide media 10); in other embodiments, web 1 may be one layer of a multilayer air filter media 10. Pleated air filter media 10 may often be rectangular in shape (which specifically includes square shapes) with pleated filter media 10 thus having a generally rectangular perimeter (which does not preclude irregularities, notches, chamfered or angled corners, or the like, in the perimeter of filter media 10). Filter media 10 and fibrous air-filtration web 1 thus often have four major edges as shown in exemplary embodiment in FIG. 1. Also as shown in FIG. 1, pleated air filter media 10 and fibrous air-filtration web 1 thereof, comprises a first side 2 bearing a first face 25, and a second side 3 bearing a second face 35. The first side 2 of pleated air filter media 10 and fibrous air-filtration web 1 comprises a plurality of first-side pleats 20, oriented in at least generally parallel relation to each other. Each first-side pleat 20 comprises a first-side pleat tip 21 and each adjacent pair of first-side pleats 20 comprises first-side pleat walls 23 that terminate in a first-side pleat valley 22. The second side 3 of pleated air filter media 10 and fibrous air-filtration web 1 comprises a plurality of second-side pleats 30, in at least generally parallel relation to each other and in oppositely-facing configuration from first-side pleats 20. Each second-side pleat 30 comprises a second-side pleat tip 31 and each adjacent pair of second-side pleats 30 comprises second-side pleat walls 33 that terminate in a second-side pleat valley 32.

Pleated air filter media 10 comprises a plurality of continuous-contact reinforcing filaments 40, as seen in exemplary embodiment in FIG. 1. By definition, continuous-contact reinforcing filaments 40 are in continuous contact with first face 25 of pleated air filter media 10 and are pleated along with fibrous air-filtration web 1 to comprise pleated filter media 10; in fact, the reinforcing filaments 40 will dictate the manner in which the fibrous air-filtration web 1 folds to form a pleated configuration, as is made clear in the discussions herein.

Reinforcing filaments 40 may be made of any material that can be extruded or otherwise obtained as a molten stream and contacted with first face 25 of first side of fibrous air-filtration web 1 so as to bond thereto; and, that when so bonded, can provide the desired reinforcing properties. Such materials may include any suitable melt-deliverable (e.g. extrudable) thermoplastic or thermoset organic polymeric materials (whether naturally occurring or synthetic). Common polymeric materials (including but not limited to polyolefins such as e.g. polypropylene, polyethylene, and copolymers thereof, poly(lactic acid); polyamides; polyethylene terephthalates; and so on), may be used to form the reinforcing filaments. Such organic polymeric materials are often comprised of relatively high molecular weight polymers, copolymers or blends. Other, minor constituents may be present, e.g. antioxidants, colorants, pigments, dyes, processing aids, and so on. In some embodiments, reinforcing filaments 40 may be non-elastic. Non-elastic as defined herein encompasses any solid material that does not have the relatively high reversible extensibility (exemplified e.g. by the ability to be reversibly elongated to e.g. 100% or more without undergoing plastic deformation) characteristic of elastic materials such as natural rubber, SBR rubber, lycra, etc. In some embodiments, reinforcing filaments 40 may be made of a material that exhibits a Young's modulus of at least 1.0, 2.0, or 3.0 GPa. In some embodiments, reinforcing filaments 40 may be made of a hot-melt adhesive composition.

A continuous-contact reinforcing filament 40 is a filament (e.g., strand) that is disposed on, and bonded to a face of, a fibrous web while the web is in a "flat" configuration. The term "flat" is used for convenience to distinguish from a pleated configuration; it will be appreciated that in many embodiments the "flat" web may exhibit slight curvature along one dimension e.g. by virtue of being in contact with a backing roll at the time that the filament is disposed on the web and/or by being rolled into a jumbo roll thereafter. (Such a "flat" web will exhibit a Gaussian curvature of zero.) After the web is pleated, a continuous-contact reinforcing filament by definition will follow the pleated structure of the web so as to be in continuous contact with the face of the web without any gaps or interruptions in which the filament is not in contact with the face of the web. A continuous-contact reinforcing filament as disclosed herein is distinguished from a strand that is formed by depositing a bead of hardenable liquid onto a fibrous web that is already in a pleated configuration so that the liquid conforms to the pleated structure (e.g. flows into the pleat valleys) and is then hardened (even if the pleated configuration is altered somewhat after the liquid is deposited and before the liquid is hardened). A continuous-contact reinforcing filament as disclosed herein thus excludes, for example, strands of the type disclosed in U.S. Pat. No. 7,235,115. A continuous-contact reinforcing filament as disclosed herein is also distinguished from filaments, strands, or in general, any elongate item that is bonded only to pleat tips and does not follow the pleated structure. A continuous-contact reinforcing filament as disclosed herein thus excludes, for example, "bridging" filaments of the type disclosed in PCT International Publication No. WO2017/213926.

In some embodiments a reinforcing filament may be compositionally compatible with, compositionally similar to, or essentially compositionally identical to, the organic polymeric material of at least some fibers of the nonwoven web to which the filament is melt-bonded. These concepts are defined and described in detail in U.S. Provisional Patent Application No. 62/346,179 and in corresponding PCT International Publication No. WO2017/213926, both of which are incorporated by reference herein in their entirety for this purpose.

As is evident from FIG. 1, in some embodiments reinforcing filaments 40 may exhibit an at least substantially linear appearance when viewed along the upstream-downstream direction of the resulting pleated air filter media. As also evident from FIG. 1, the overall long axis of each reinforcing filament 40 will, on average, be oriented at least generally, substantially or essentially orthogonal to (e.g., within +/− about 5 degrees of 90 degrees to) the Pleat Direction of pleated filter media 10 (with the Pleat Direction meaning a direction parallel to pleat tips 21 and 31, as signified by the Pleat Direction arrow in FIG. 1). In some embodiments, the entirety of all reinforcing filaments 40 may be oriented at least essentially orthogonal to the Pleat Direction. In some embodiments, the entirety of all reinforcing filaments 40 may be at least generally, substantially, or essentially aligned with the Folding Direction of pleated filter media 10 (the Folding Direction of a media is the overall direction along which the media folds and "accordionizes" (compresses) in order to assume a pleated configuration; the Folding Direction is orthogonal to the Pleat Direction and is orthogonal to the upstream/downstream direction of the resulting pleated media).

In some embodiments, reinforcing filaments 40 may be at least generally, substantially, or essentially at least locally parallel to each other. In some embodiments, reinforcing filaments 40 may be spaced, e.g. evenly spaced, along the Pleat Direction of the pleated media, again as is evident in the exemplary design of FIG. 1. Filaments can comprise suitable spacings between individual filaments as desired. In various embodiments, the filament spacing can average at least 1, 2, 4, 6, 8, 16 or 24 mm. In additional embodiments, the filament spacing can average at most 50, 40, 30, 20, 15, 12, 10, or 8 mm. The filament spacings can be substantially or essentially uniform or can be varied. Regardless of the specific arrangements, a suitable set of filaments will collectively comprise a highly open structure (in various embodiments, comprising greater than at least 80, 90, or 95% open area) so as to allow sufficient airflow through pleated filter media 10.

Reinforcing filaments 40 thus take the form of filaments that are individually provided (e.g., extruded onto a major surface of fibrous air-filtration web 1) and are not connected with each either directly, or indirectly by way of any other entity (except for the pleated filter medium). This thus excludes filaments that are e.g. part of a pre-existing entity (e.g. a scrim) that is attached, as a whole, to a face of an fibrous web. Moreover, any such set of filaments as disclosed herein will be distinguished from a non-filamentary support structure or structures that are provided on the downstream side of a pleated filter (and that are often bonded to a supporting perimeter frame) to rigidify the thus-formed air filter. In other words, a set of reinforcing filaments as disclosed herein does not encompass e.g. perforated sheets of cardboard or metal, or strips of cardboard or metal, as are often provided on the downstream side of a pleated filter. In some embodiments, no such ancillary components (e.g. perforated sheets, straps, and so on) are present. In other embodiments, any such ancillary components may be present in addition to the reinforcing filaments. In some particular embodiments the pleated air filter media does not include any kind of reinforcing layer (e.g. a wire mesh) that is bonded (e.g. adhesively bonded) to a major surface of the media and is pleated along with the media.

As noted earlier, reinforcing filaments 40 are provided with bending zones 41 that are spaced along the elongate length of each filament 40 and are spaced along a Folding Direction of web 1 as exemplified by the three representative bending zones 41 identified in FIG. 1. Each bending zone 41 is registered with a first-side pleat tip 21 or a first-side pleat valley 22. By this is meant that at least a portion of the bending zone is bonded to, and is curved in conformance with, the pleat tip or the pleat valley.

Figure 2:
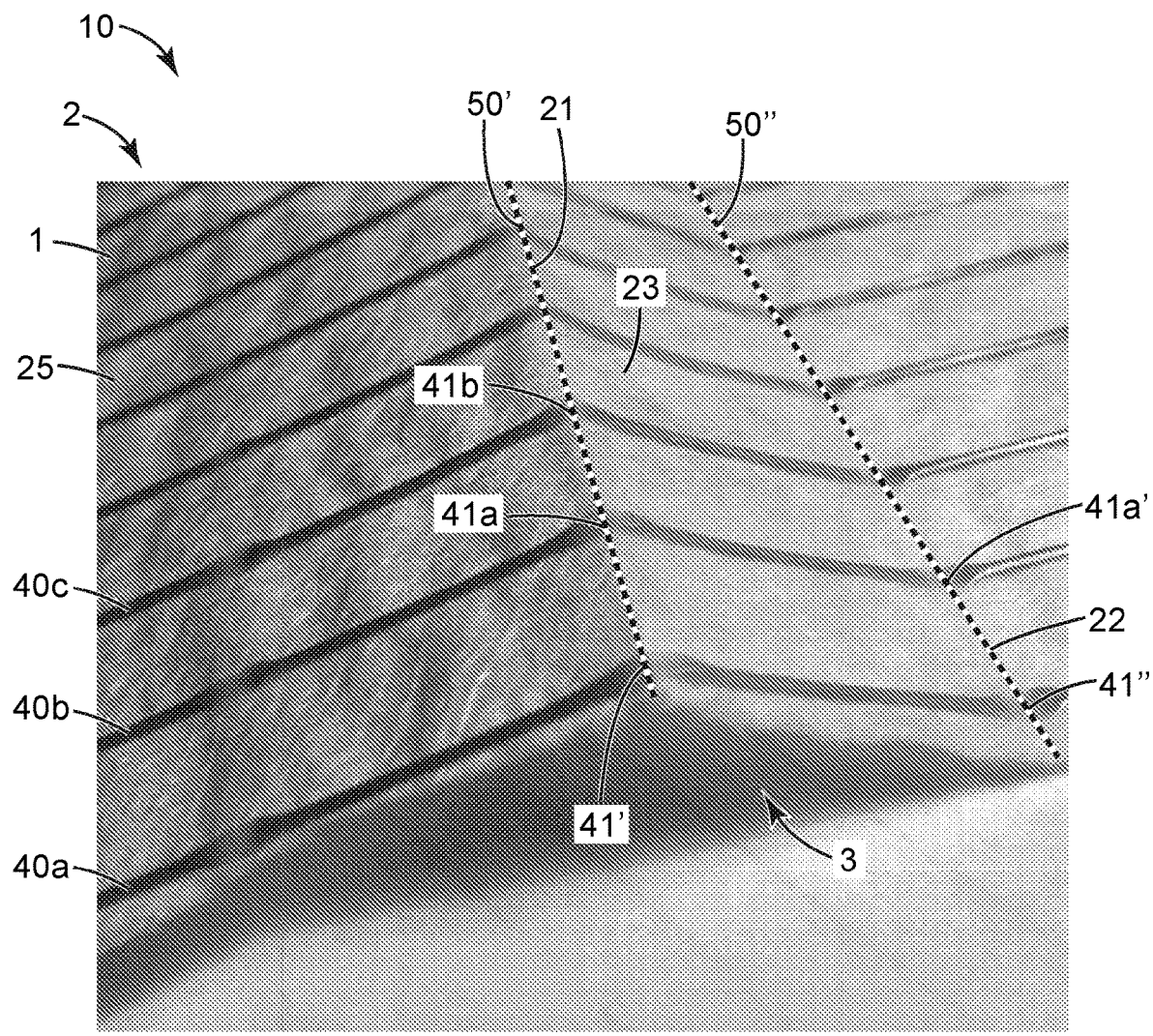
FIG. 2 is an optical photograph of an exemplary fibrous air-filtration web bearing exemplary continuous-contact reinforcing filaments on a first face of the web, shown partially folded into a pleated configuration.

These arrangements are illustrated in exemplary embodiment in FIG. 2, which is an optical photograph of an actual fibrous air-filtration web 1 bearing reinforcing filaments 40, with the web shown having partially completed the process of being formed into a pleated configuration. Although web 1 as shown in FIG. 2 has not fully assumed its final pleated configuration, it is sufficiently far along the process that identifying characteristics and features can be identified. Thus, exemplary locally-thinned bending zones 41' and 41" are identified, spaced along the long axis of reinforcing filament 40a. As is evident from FIG. 2, nearest-neighbor bending zones 41 of adjacent reinforcing filaments (for example, bending zones 41', 41a and 41b of filaments 40a, 40b and 40c) are at least generally linearly aligned along a folding line (identified by phantom line 50' of FIG. 2). Nearest-neighbor bending zones 41" and 41a' of filaments 40a and 40b are likewise at least generally aligned along a folding line 50".

These arrangements are achieved by melt-bonding (e.g. extrusion-bonding) filaments 40 to the first face 25 of web 1; and, while the filaments are still at least somewhat soft or semi-molten, equipping them with locally-thinned bending zones 41. This is done with web 1 in a "flat" (i.e., non-pleated) configuration. This is illustrated in FIG. 3, which is an optical photograph of a web 1 in a flat configuration after having been equipped with reinforcing filaments 40.

Figure 3:
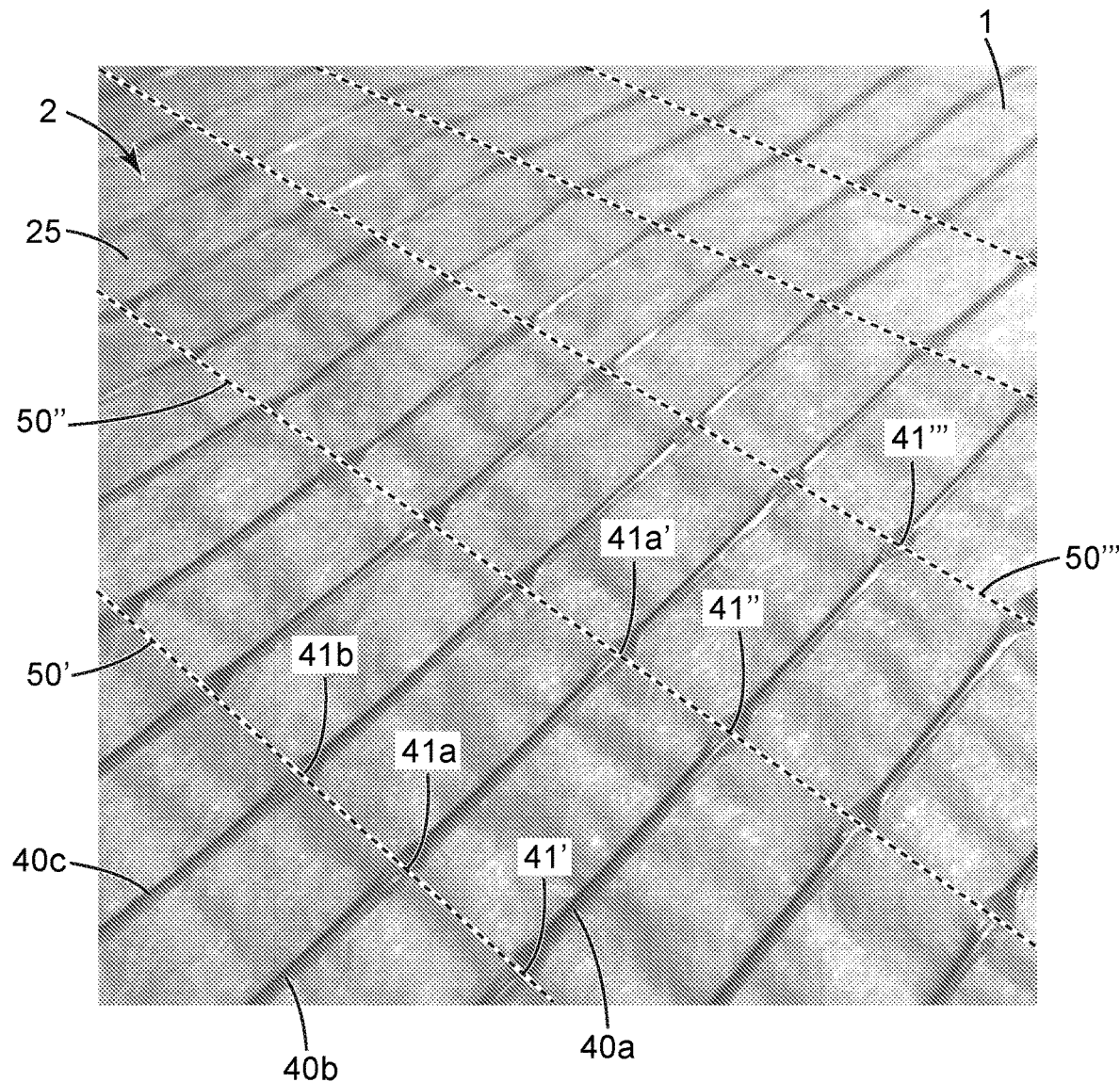
FIG. 3 is an optical photograph of an exemplary fibrous air-filtration web bearing exemplary continuous-contact reinforcing filaments on a first face of the web, shown in a flat-web configuration.

Thus, as is evident in FIG. 3, a plurality of reinforcing filaments 40 are provided on at least a first face 25 of web 1, e.g. in an at least generally parallel, spaced apart configuration. The elongate axes of filaments 40 are, on average, oriented along what will become the Folding Direction of web 1. Bending zones 41 are provided, spaced along the long axis of each reinforcing filament. (Representative bending zones 41', 41", and 41''' are identified in FIG. 3, spaced along the long axis of reinforcing filament 40a.) As is evident from FIG. 3, selected bending zones of adjacent reinforcing filaments (for example, bending zones 41', 41a and 41b and 41a of filaments 40a, 40b and 40c are at least generally linearly aligned with each other so as to define a folding line (identified by phantom line 50' of FIG. 3). Nearest-neighbor bending zones 41" and 41a' of filaments 40a and 40b are likewise at least generally aligned to define an adjacent folding line 50". Still another folding line 50''' is also identified in FIG. 3. Folding lines 50 serve to collectively define a Pleat Direction.

As can be appreciated from inspection of FIGS. 2 and 3, application of a force directed e.g. along the Folding Direction of web 1, will result in web 1 preferentially folding along the folding lines 50 that are collectively established by bending zones 41. This provides a pleated air filter media 10 comprising a Pleat Direction that is aligned with folding lines 50. Successive, nearest-neighbor folding lines 50 form pleat tips 21 and pleat valleys 22. It is thus noted that bending zones 41 must allow bending in two directions rather than just one direction. That is, with reference to FIG. 2, bending zone 41' is registered with (incipient) pleat tip 21, while adjacent bending zone 41" is registered with (incipient) pleat valley 22. Thus in the formation of pleat valley 22, bending zone 41" is required to bend in an opposite direction from the direction in which bending zone 41' is required to bend in the formation of pleat tip 21. This property will be referred to as bending zones 41 being required to be bidirectionally bendable.

Since the bending stiffness of a beam or plate tends to follow approximately the third power of the thickness of the beam or plate, a reduction in thickness can cause an advantageously large reduction in stiffness thus allowing easy bending. The representative depiction of FIG. 1, and the actual photographs of Working Example webs as shown in FIGS. 2 and 3, illustrate the role of bending zones 41 in collectively establishing folding lines 50 along a fibrous air-filtration web 1. These folding lines 50 allow web 1 to be preferentially folded along folding lines 50 to form a pleated air-filter media 10. As noted earlier, in many embodiments this can be done without the necessity of performing such actions as pre-scoring web 1 to impart folding lines to the web (although in some embodiments this might be done e.g. as an adjunct to the procedures disclosed herein).

Figure 4:
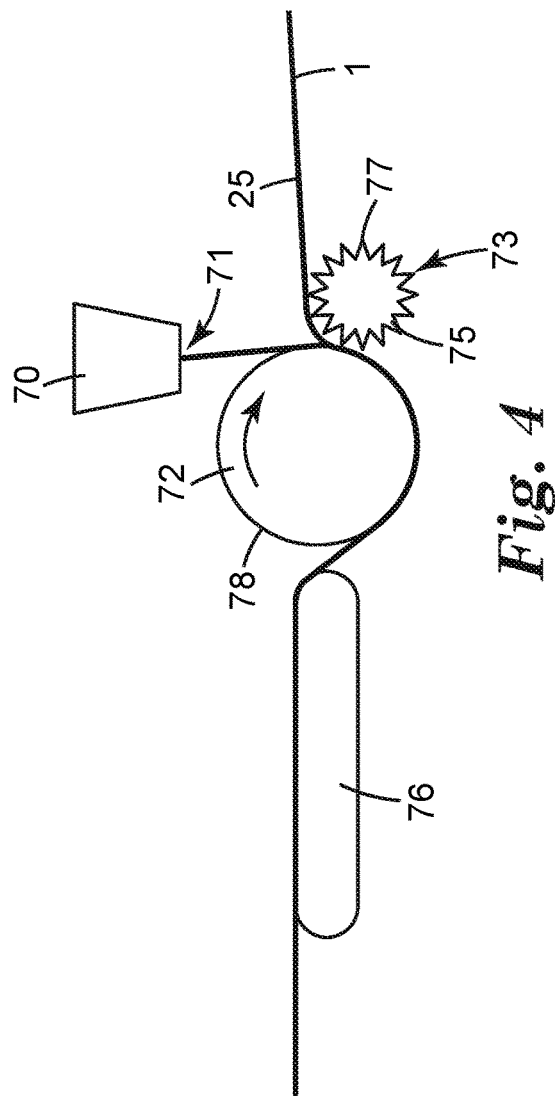
FIG. 4 is a schematic representation of an exemplary apparatus and process for disposing continuous-contact filaments on a fibrous air-filtration web and forming locally-thinned bending zones at selected locations along the elongate lengths of the filaments.

Bending zones 41 are established by providing reinforcing filaments 40 with locally-thinned zones. Exemplary ways in which this can be achieved will now be discussed. With reference to FIG. 4, in some embodiments reinforcing filaments 40 may be generated by any desired extrusion apparatus 70 and method that will provide streams of molten extrudate 71 in such form that they can be extrusion-bonded to first face 25 of fibrous air-filtration web 1 (while web 1 is in a "flat" (unpleated) condition as noted previously). By "extrusion-bonded" is meant a filament that is bonded to fibers of a first face of a fibrous web by being extruded as a molten stream of material that is contacted with the first face of the web and solidified in order to melt-bond to the first face of the web. In some embodiments the molten stream may be partially solidified (e.g. by being contacted with a chill roll) before contacting the face of the fibrous web; such methods still fall under the auspices of extrusion-bonding. By definition, melt-bonding (e.g. extrusion-bonding) as disclosed herein, and melt-bonds formed thereby, are distinguished from methods and resulting bonds such as achieved by e.g. ultrasonic bonding, solvent-bonding, bonding by way of pressure-sensitive adhesives or photocurable adhesives, and so on.

An extrusion apparatus 70 may be any kind of extruder (e.g. a single-screw extruder, twin-screw extruder, and so on) that comprises orifices for extruding an organic thermoplastic or thermoset material as molten streams in a spaced-apart relationship. Each reinforcing filament may be formed by extruding a flowstream of molten material from an orifice of the die. The dimensions of the filaments may be varied e.g. by changing the extruder screw speed and/or by changing the speed at which the fibrous air-filtration web is moved relative to the extruded streams of molten material. In most embodiments, the molten streams will be extruded in a direction this is at least generally aligned with the machine direction (i.e. the longitudinal direction of motion) of the moving fibrous air-filtration web (and that is at least generally orthogonal to the Pleat Direction that is established when the web is subsequently pleated).

In some embodiments, reinforcing filaments 40 may be disposed on first face 25 of first face 25 of fibrous air-filtration web 1 (while web 1 is in a "flat" condition as noted) by a deposition apparatus and method of the general type described e.g. in U.S. Pat. Nos. 7,235,115 and 8,419,817, both of which are incorporated by reference herein in their entirety for this purpose. Such apparatus are configured to deposit molten streams onto a surface of a substrate and are sometimes referred to as grid melters or drizzle-glue depositors. Often, special compositions (e.g. hot-melt adhesive compositions) are used with such apparatus. Such compositions may include e.g. polypropylene-based compositions, ethylene-vinyl acetate-based compositions, and so on, and may include e.g. various waxes, tackifiers, and so on as desired. Any such composition, when melted to an at least semi-molten state and disposed on a flat fibrous web and cooled and solidified so as to melt-bond thereto, may provide a reinforcing filament as disclosed herein.

The filaments 40 as deposited onto a first face of web 1 can be processed, e.g. while still in a partially-solidified (e.g., soft or even semi-molten) condition, to include locally-thinned bending zones 41. In one approach, this may be done by impinging solid members onto the second face of fibrous web 1 at selected locations along the elongate length of the partially-solidified filaments, while the first face (the filament-bearing face) of web 1 is supported e.g. by a backing roll. The force exerted by the solid members can cause the filaments to be locally deformed to form locally-thinned bending zones 41.

In some convenient embodiments, this may be performed by using an apparatus comprising a tooling roll 73 that includes multiple ridges 75 (made e.g. of any suitable metal, e.g. steel). Ridges 75 extend across the lateral (crossweb) extent of roll 73 and are spaced circumferentially around roll 73 as shown in exemplary embodiment in FIG. 4. Tooling roll 73 is used in combination with a backing roll 72 (e.g. a steel roll). The above-described plurality of molten streams can be disposed (e.g. extruded) onto the surface 78 of backing roll 72. In some embodiments the temperature of backing roll 72 can be set to a desired set point order to establish the speed with which the molten streams solidify into filaments. Fibrous air-filtration web 1 can be fed into a nip between tooling roll 73 and backing roll 72 as shown in FIG. 4. The first face of web 1 will thus be brought into contact with the partially-solidified filaments that are carried on surface 78 of backing roll 72. As the rolls counter-rotate and the partially-solidified filaments and web 1 move through the nip, the tip 77 of a ridge 75 of tooling roll 73 will impinge on the second face of web 1. The force of "pinching" the web and partially-solidified filaments between tip 77 and surface 78 of backing roll 72 will cause local deformation of the partially-solidified filaments to form the desired locally-thinned zones.

As rolls 73 and 72 rotate, successive ridges 75 of roll 73 are periodically impinged onto web 1 so that tips 77 of ridges 75 impinge at spaced-apart locations along filaments 40 to cause the desired local thinning. The distance at which the locally-thinned zones are spaced apart along the elongate length of the filaments will be established by the distance at which the ridge tips 77 are spaced circumferentially along the surface of tooling roll 73. Since ridges 75 are oriented with their long axes aligned with the crossweb direction of web 1 along which filaments 40 are spaced, the impingement of any particular ridge 75 onto multiple filaments will simultaneously form multiple locally-thinned zones in the multiple filaments. Therefore, the thus-formed bending zones will automatically be at least generally linearly aligned with each other as dictated by ridge 75. By way of a specific example, bending zones 41', 41a, and 41b as shown in FIGS. 2 and 3 were all formed simultaneously by the impingement of a single ridge 75 at these location along filaments 40a, 40b and 40c and are all aligned with each other.

Fibrous web 1, now bearing reinforcing filaments 40 that comprise locally-thinned zones 41, may wrap around backing roll 72 to any desired extent, e.g. in order to more fully solidify filaments 40. The resulting article can then be carried away from rolls 72 and 73 e.g. by a carrier belt 76 or by any suitable web-handling apparatus.

In another approach, molten streams may be disposed (e.g. extruded) directly onto the first face 25 of fibrous web 1 rather than e.g. being extruded onto a backing roll and then transferred to the first face of fibrous web 1. In such an approach, web 1 bearing the partially-solidified filaments on the first face thereof may be supported by a backing roll and brought into a nip comprising a ridged tooling roll of the general type described above. As web 1 passes through the nip and the rolls rotate, successive ridge-tips are periodically impinged onto multiple filaments to penetrate into particular locations of the filaments to cause the desired local thinning. Such an approach thus involves impinging a solid member (e.g. a ridge-tip of a tooling roll) directly into a partially-solidified filament to deform the filament. Such methods vary from the above-described approach in which a solid member (e.g. a ridge-tip) is impinged onto the second (rear) face of the filament-bearing web in order to deform the filament. However, both approaches achieve similar ends, and both are encompassed within the herein-disclosed concept of applying a force at selected locations along the elongate lengths of filaments to locally deform the partially-solidified filaments at the selected locations to form locally-thinned zones that are spaced along the elongate lengths of the partially-solidified filaments.

However the local deformation of the filaments is achieved, reinforcing filaments 40 with locally-thinned bending zones 41 formed therein can then be allowed to solidify, e.g. as filament-bearing web 1 is carried away from rolls 72 and 73 e.g. by a carrier belt 76 or by any suitable web-handling apparatus. Filament-bearing web 1 can then be delivered to any desired downstream process (e.g. a pleat-forming process), or can be stored until such downstream processing is to be performed. It will be understood that FIG. 4 is a generic, simplified representation. Any suitable web-handling equipment (including e.g. idler rolls, steering rolls, and so on) may be used to facilitate and optimize the processes disclosed herein.

The above discussions have concerned embodiments in which locally-thinned bending zones are formed in reinforcing filaments before the filaments have completely hardened. Such approaches may advantageously be performed in-line with a process of e.g. extrusion or drizzle glue deposition. However, in some embodiments reinforcing filaments may be at least substantially hardened before the locally-thinned bending zones are formed therein. This may be done e.g. by using similar methods as those described above, except that it might be necessary, for example, to heat at least the ridge-tips of the tooling roll so that they can locally soften (e.g. melt) and deform the reinforcing filaments. It may also be helpful to increase the pressure that is applied in the deformation process. Such approaches can allow that a filament-bearing fibrous web can be stored (e.g. as a "jumbo" (intermediate) roll) until such time as it is desired to impart the filaments with locally-thinned bending zones.

Figure 5:
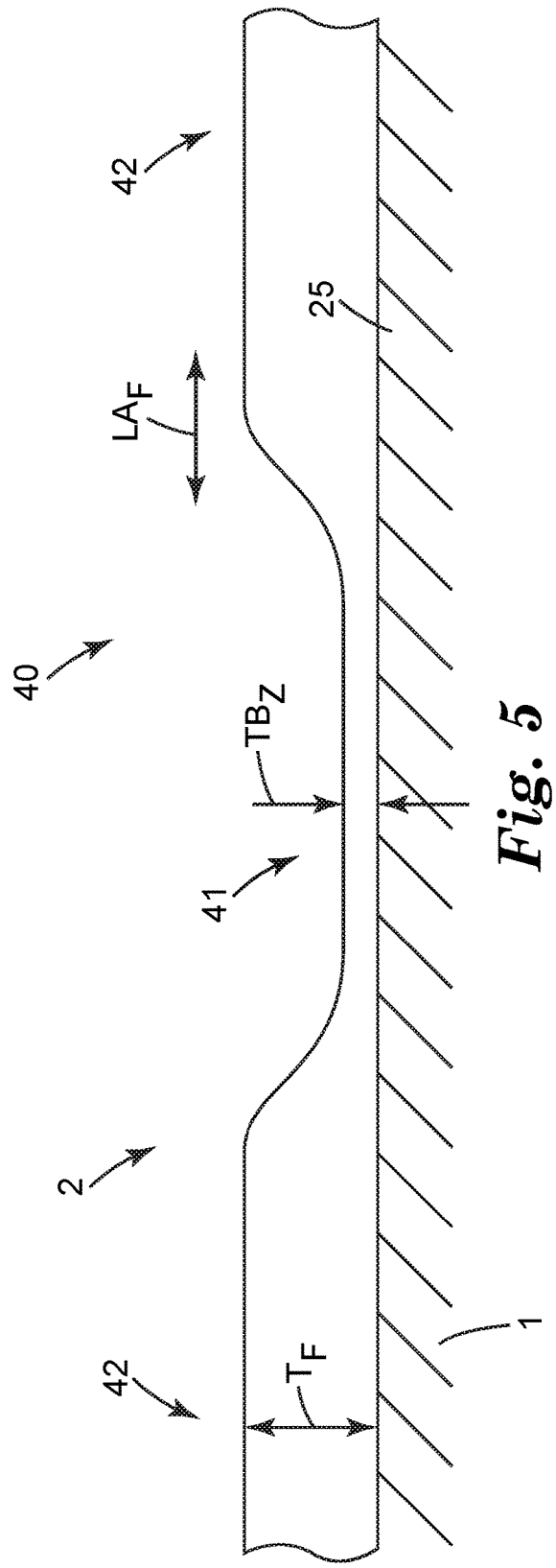
FIG. 5 is a side view of a portion of an elongate length of an exemplary continuous-contact reinforcing filament, viewed along the transverse axis of the filament.

An exemplary reinforcing filament 40 is shown in generic, idealized representation in FIG. 5. Reinforcing filaments 40, in portions 42 that are not locally-thinned bending zones 41, may comprise any desired average diameter. It is noted that the term diameter encompasses an equivalent diameter which is used in the case of filaments with a non-circular or irregular cross-section. The equivalent diameter will be the diameter of a circle having the same area as the non-circular shape in question. In various embodiments, the average diameter may be at most about 3.0, 2.5, 2.0, 1.5, 1.0, 0.5, 0.2, or 0.1 mm. In further embodiments, the filaments may comprise an average diameter of at least about 0.05, 0.10, 0.20, 0.40, or 0.80 mm. As disclosed herein, a reinforcing filament 40 is melt-bonded (e.g. extrusion-bonded) to a face of a fibrous web 1 and is distinguished from fibers that form the fibrous web itself.

(e.g., fibers that were originally collected to form a nonwoven fibrous web). As discussed elsewhere herein, may be advantageous that the collective stiffness of the reinforcing filaments should be higher than the stiffness of the fibrous web itself, so that the folding behavior of the filament-bearing fibrous web is largely governed by the bending zones of the reinforcing filaments. Thus in various embodiments, the average diameter of reinforcing filaments 40 (in non-thinned portions 42) may be greater than the average diameter of the fibers of fibrous web 1 by a factor of at least 5, 10, 20, 40, 80, or 100. (All such averages will be obtained from number-average calculations, not weight-average calculations.) Reinforcing filaments may comprise any suitable shape when viewed in cross section, (e.g., generally round, rectangular, oblong, etc.). Such shapes may depend for example on the viscosity of the (e.g. semi-molten) incipient filament as it hits the surface of web 1 or of a support (backing) roll, the tendency of the material to wet into web 1 or to spread over the surface of web 1 or of a support roll, etc.

Figure 6A:
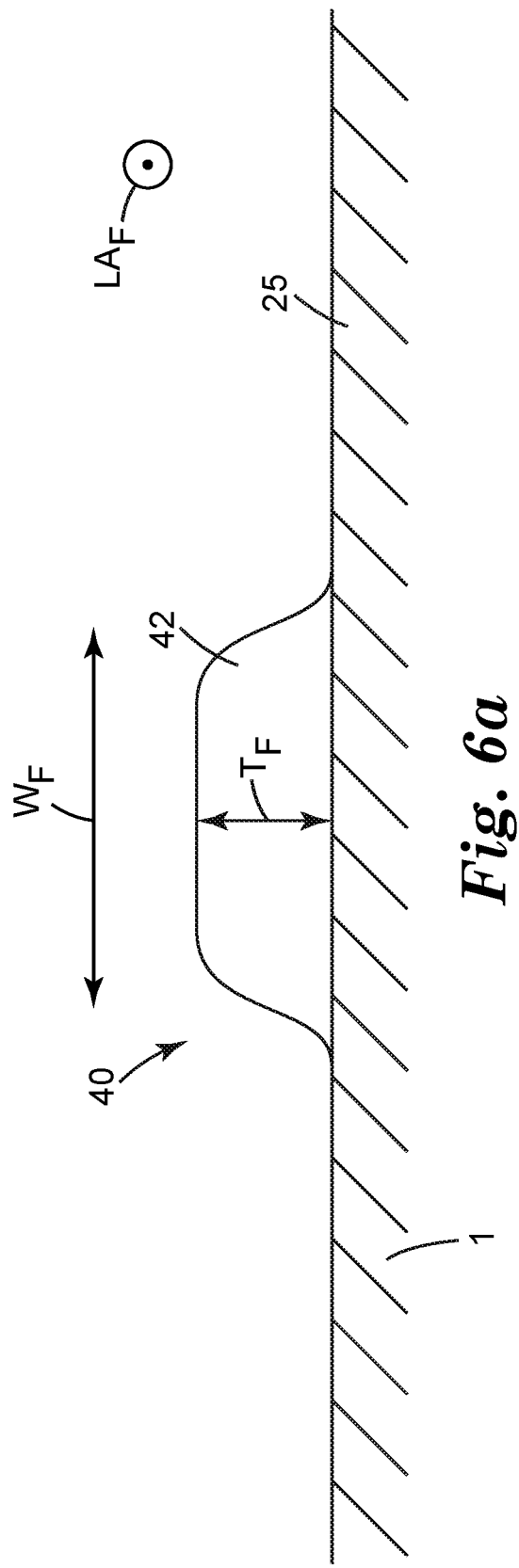
FIG. 6a is a cross-sectional slice view of an exemplary continuous-contact reinforcing filament, viewed along the long axis of the filament.
Figure 6B:
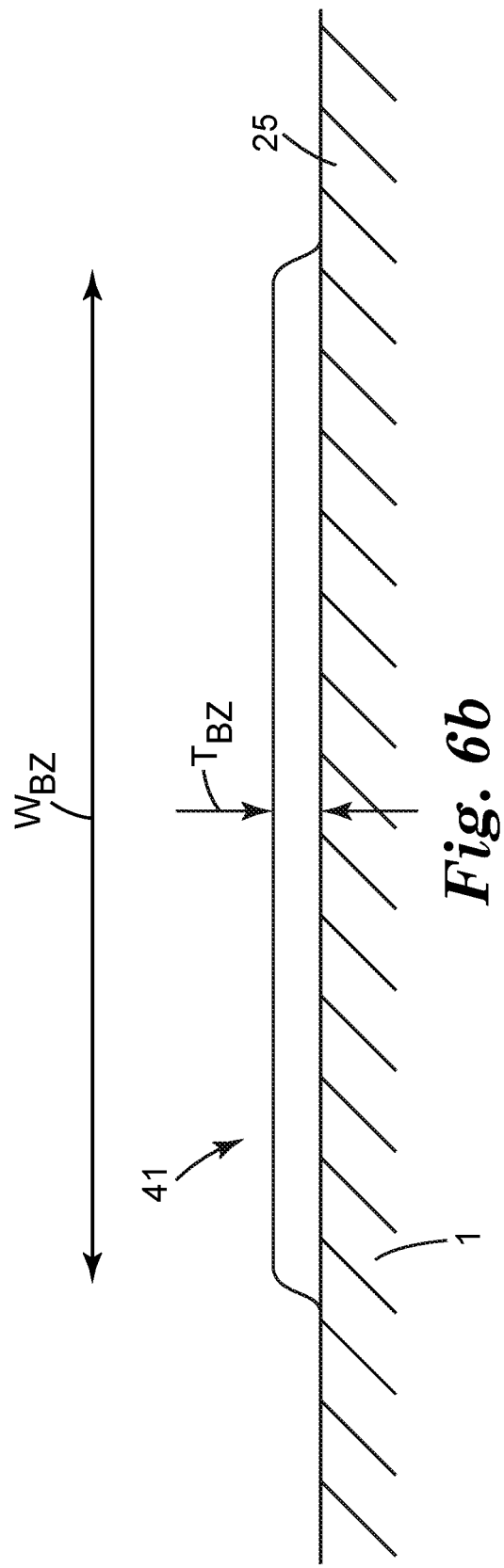
FIG. 6b is a cross-sectional slice view of an exemplary locally-thinned bending zone of the exemplary continuous-contact reinforcing filament of FIG. 6a, viewed along the long axis of the filament.

Exemplary, generic representations of possible filament shapes (in non-thinned portions 42) are shown in cross-sectional slice view (looking along the long axis of a portion 42 of filament 40) in FIGS. 6a and 7a. Regardless of the specific shape, any filament (again, in portions 42 that are not locally-thinned bending zones 41) will exhibit a filament thickness $T_F$ as indicated in FIGS. 6a and 7a. The filament thickness $T_F$ is also indicated in FIG. 5, which is a side view, in generic representation, of a portion of the elongate length of a filament 40 that includes a locally-thinned bending zone 41 and also includes portions 42 that are not locally-thinned bending zones. (The long axis $LA_F$ of the filament is indicated on FIG. 5; it is emphasized that FIG. 5, as well as FIGS. 6 and 7, are idealized representations and that a locally-thinned bending zone as made by an industrial production process may differ somewhat from the generic representations shown in these Figures.) The filament thickness $T_F$ at a given location of a reinforcing filament 40 is the dimension of the filament along a direction that is orthogonal to the plane of the fibrous web 1 at that location of the filament and web, as is evident from FIG. 5. Reinforcing filaments 40 will comprise a filament width $W_F$, also as shown in exemplary embodiment in FIGS. 6a and 7a. The filament width $W_F$ at a given location is the transverse dimension of the filament; that is, its dimension along a direction that is aligned with the Pleat Direction of the pleated media.

The properties of locally-thinned bending zones 41 of filaments 40 can be discussed relative to the properties of the non-thinned portions 42 of filaments 40 (noting that the properties of portions 42 are those of the filaments as originally disposed and hardened on the face of the web, in the absence of any deforming/thinning force). A locally-thinned bending zone will have a bending zone thickness $T_{BZ}$ as shown in FIG. 5. Bending zones thicknesses $T_{BZ}$ are also identified in FIGS. 6b and 7b, which are cross-sectional slice views of bending zones 41 of exemplary reinforcing filaments of FIGS. 6a and 7a.

The bending zone thickness $T_{BZ}$ will be the minimum thickness at any location along the bending zone. For a bending zone 41 of a reinforcing filament 40, the bending zone thickness $T_{BZ}$ can be evaluated in relation to the filament thickness $T_F$ of a neighboring non-thinned portion 42 of that same filament 40. For convenience, a location halfway between the bending zone and a nearest-neighbor bending zone of the same filament can be used as a suitable location to obtain the filament thickness $T_F$ of portion 42.

These values can be used to define a thinning ratio, which is defined as the bending zone thickness divided by the filament thickness. As disclosed herein, a locally-thinned bending zone will exhibit a thinning ratio that is less than 0.5 (which, in the ideal case, might be expected to result in a reduction in bending stiffness of almost 90%). In various embodiments, such a thinning ratio may be less than 0.4, 0.3, 0.25, 0.20, 0.15, or 0.10. By way of a specific example, the exemplary locally-thinned bending zone 41 depicted in FIG. 7b exhibits a thinning ratio of approximately 0.3 in relation to the neighboring portion 42 of filament 40 depicted in FIG. 7a.

Since in many convenient embodiments a locally-thinned zone 41 is formed by locally displacing material of the e.g. semi-solidified filament (rather than e.g. by interrupting the flow of molten material that forms the filament), in some embodiments the local thinning of a filament 40 may result in local transverse spreading of the filament material. This is readily apparent for the various locally-thinned bending zones (e.g., zones 41', 41a, and 41b) of FIGS. 2 and 3. For any given bending zone, a bending zone width $W_{BZ}$ can be defined and can be compared to the filament width $W_F$ to obtain a transverse spreading ratio, in similar manner as for the thinning ratio. In various embodiments, a locally-thinned bending zone may exhibit a transverse spreading ratio of at least 1.2, 1.4, 1.6, 1.8, 2.0, 2.2, 2.4, 2.6, or 3.0. By way of a specific example, the exemplary locally-thinned bending zone 41 depicted in FIG. 6b exhibits a transverse spreading ratio of approximately 2.5 in relation to the neighboring portion 42 of filament 40 depicted in FIG. 6a. Due to the displacement of material, in some instances a slightly thicker lip or bulge may be present at an end of filament portion 42 that immediately borders a bending zone 41; such a feature can be disregarded when obtaining the above-mentioned filament thickness $T_F$.

A locally-thinned bending zone 41 can be configured to have an elongate length (along the long axis of filament 40) of any value that is sufficient to allow the desired bending. Beyond this minimum requirement, a bending zone 41 can have any desired elongate length, which may be chosen e.g. to promote a desired radius of curvature of the pleat tip or valley whose formation is facilitated by the bending zone. In various embodiments, a locally-thinned bending zone 41 can comprise an elongate length of at least 0.1, 0.2, 0.5, 1.0, 1.5, 2.5, 3.0, or 5.0 mm. In further embodiments, a locally-thinned bending zone 41 can comprise an elongate length of at most 20, 10, 6.0, 4.0, or 2.0 mm.

Locally-thinned bending zones 41 can be spaced apart down the elongate length of reinforcing filaments 40 as desired. It will be appreciated that this distance will establish the dimension of pleat walls 23/33 between the pleat tips and pleat valleys, and will place general limits on the combination of pleat spacing and pleat height that can be achieved. In various embodiments, bending zones can be spaced apart by at least 0.5, 1.0, 1.5, 2.0, 2.5, 3.0, 4.0, 5.0, 7.0, or 9.0 cm. In further embodiments, bending zones 41 can be spaced apart by at most 11, 10, 8.0, 6.0, or 3.5 cm.

The presence of locally-thinned zones 41 in reinforcing filaments 40 enable a fibrous air-filtration web 1 to fold preferentially, and easily, along folding lines 50 established by the locally-thinned zones 41. At the same time, the presence of non-thinned portions 42 of reinforcing filaments 40 can advantageously provide that the thus-formed pleat walls 23/33 can be quite stiff At any desired time subsequent to the formation of locally-thinned bending zones 41, fibrous air-filtration web 1 bearing reinforcing filaments 40 on at least one face thereof may be processed in an operation in which it is folded into a pleated configuration to form pleated air filter media 10. In many embodiments, a force may be applied at least generally along the long axis of web 1 (i.e., along the Folding Direction as shown in FIG. 1) to promote folding of the web. However, to ensure that the folding direction alternates at each successive folding line (i.e. to form successive pleat tips and pleat valleys) in some cases at least some force may be imparted (e.g. along what will become the upstream/downstream directions of the pleated air filter media) to urge various sections of web 1 in the desired directions so that the web folds in the desired "accordionized" fashion. Such forces may be applied in addition to, or instead of, a force along the Folding Direction. Whatever the specific nature of the forces and/or manipulations applied, such web-folding and positioning processes are referred to in general as "gathering" processes. Ordinary artisans will appreciate that many apparatus are available for performing such processes. Such apparatus may rely on e.g. one or more helical screw conveyors, one or more conveyors having a plurality of spaced-apart flites or cleats, and so on. Any such device may set the above-mentioned pleat spacing, pleat height, and so on, within the general limits established by the distance that the bending zones are spaced apart down the elongate length of the reinforcing filaments. Various apparatus and processes of which at least certain devices or sub-processes may be useful for "gathering" operations are disclosed e.g. in U.S. Pat. Nos. 4,976,677, 5,389,175, 7,235,115 and 9,808,753.

In any of the above methods, the ability of the media to be gathered may be optionally enhanced if desired, by using media that is pre-scored (i.e., before the filament deposition) using conventional scoring processes such as e.g. rotary-scoring. However, in many embodiments the presence of the herein-disclosed bending zones in filaments 40 may render such measures unnecessary. Thus in some embodiments, fibrous web 1 is not a pre-scored web.

In the present work, in some cases the passing of a filament-bearing fibrous web through a nip between protruding ridges 75 of a tooling roll 73, and a backing roll, has resulted in at least some force being transmitted to the web itself in areas of the web not bearing filaments. Thus in some instances slight depressions or indentations have been visible in the filament-bearing fibrous web, aligned with (superimposed on) folding lines 50. The present arrangements may thus have at least a slight effect that resembles conventional web scoring; however, it is considered that the presence of the bending zones in the reinforcing filaments is a significant, e.g. a major, contributor in achieving the herein-disclosed folding behavior. That is, it is believed that in many instances it is the low bending stiffness of bending zones 41 of the reinforcing filaments in comparison to the higher bending stiffness of the remaining portions 42 of the filaments, that causes the preferential folding of reinforcing filaments 40 and of web 1 to which they are attached, rather than the folding behavior being dominated by web 1 itself.

Once fibrous web 1 is folded to the desired pleat configuration, the thus-formed pleated air filter media 10 may be e.g. framed or otherwise captured or held in the desired configuration, in any suitable manner. If desired, heat-setting may be optionally used to promote the tendency of the filaments and/or the web to maintain the pleated configuration.

In some embodiments a filament-deposition (e.g. extrusion) apparatus and a locally-thinning apparatus may be set up in-line with a gathering apparatus so that fibrous air-filtration web can be folded into the desired pleated configuration immediately after the reinforcing filaments are sufficiently hardened. For example, an extrusion/locally-thinning process line may output a fibrous air-filtration web, in a flat form and bearing reinforcing filaments thereon, directly to a gathering station. In other embodiments, the flat web bearing reinforcing filaments may be e.g. rolled into a jumbo until ready to be gathered and pleated. In some embodiments a fibrous air-filtration web bearing reinforcing filaments can be gathered into a configuration in which the pleats are fully and completely pressed together (i.e., fully accordionized) to form a pleat pack that can be stored. The pleat pack may then be brought to the desired pleat spacing (e.g. it may be expanded from a compressed configuration) and processed (e.g. framed) as desired.

Pleated air filter media 10 may comprise any suitable fibrous air-filtration web that is configured to allow filaments to be melt-bonded thereto. This may be achieved e.g. by providing that at least some fibers of the web are at least compositionally compatible with the organic polymeric material of the filaments, by providing that the web comprises sufficient number and size of interstitial spaces between fibers to allow the incipient filaments to penetrate thereinto, or any combination of such measures. Potentially suitable materials may take any form including e.g. nonwovens, such as melt blown or spunbond webs of synthetic or natural fibers. Any suitable method of making a nonwoven web (e.g., melt-blowing, melt-spinning, air-laying, carding, and so on) may be used. Filter media 10 may also include sorbents, catalysts, and/or activated carbon (whether in the form of e.g. granules, fibers, fabric, and molded shapes). Multilayer media, e.g. laminated media, can also be used as filter media 10. Such media may consist of laminated layers of the media discussed above or of other substrates laminated to one or more layers of filter media, for example. In some embodiments, a prefilter layer may be used on a side of filter media 10 that becomes the upstream side of the finished air filter. In instances in which pleated air filter media 10 comprises a multilayer media, the previously-disclosed concepts e.g. of disposing a reinforcing filament on a major surface of a fibrous air-filtration web, of a bending zone being in contact with a pleat tip or a pleat valley, and so on, will be understood to encompass situations in which the filament is disposed on, the bending zone is in contact with, and so on, a face of an outermost layer of a multilayer structure (e.g. a multilayer fibrous web).

In some embodiments, the fibrous web includes polyolefinic fibers (e.g. polyethylene, polypropylene and copolymers thereof). In some specific embodiments, the fibrous air-filtration web comprises, or consists essentially of, polypropylene fibers (noting that this latter condition does not preclude the presence of e.g. electret moities, and/or processing additives, UV stabilizers and so on, as are customarily used with polypropylene). Regardless of the specific composition, in some embodiments the fibrous air-filtration web may be chosen so that reinforcing filaments may be selected that are at least compositionally compatible therewith. In various embodiments, a nonwoven fibrous air-filtration web (e.g. a spunbonded or meltblown web comprising electrets as described below) comprised of, or consisting essentially of, polypropylene homopolymer fibers may be used in combination with reinforcing filaments that are likewise comprised of, or consist essentially of, polypropylene homopolymers.

It is noted that even in the absence of the filaments being e.g. at least compositionally similar to the organic polymeric material of the fibers of the fibrous air-filtration web (and in the absence of the material of the filaments exhibiting any pressure-sensitive adhesive properties), adequate bonding of filaments to the fibrous web may occur. Such bonding may be achieved e.g. by way of the molten material of the incipient filament penetrating into interstitial spaces between the fibers of the web. And, in some particular embodiments, the filament composition may be chosen (e.g. it may be a hot-melt adhesive composition) to exhibit enhanced ability to bond to a fibrous web.

In specific embodiments, fibrous air-filtration web 1 may be an electret material, comprised of e.g. any charged material, e.g. split fibrillated charged fibers as described in U.S. Pat. No. RE 30,782. Such charged fibers can be formed into a nonwoven web by conventional means and optionally Joined to a scrim such as disclosed in U.S. Pat. No. 5,230,800 forming an outer support layer. In other specific embodiments, fibrous air-filtration web 1 can be a melt blown microfiber nonwoven web, e.g. such as disclosed in U.S. Pat. No. 4,813,948, which can optionally be joined to a secondary layer during web formation as disclosed in that patent, or subsequently joined to a secondary web in any conventional manner. In some embodiments, fibrous air-filtration web 1 can be a meltspun, e.g. spunbonded, nonwoven web. Spunbonded webs that may be particularly suitable include e.g. those of the general type described in U.S. Patent Application Publication 20080038976 to Berrigan. Any such media can be charged to form an electret, if desired. In some embodiments, a spunbonded web may be a high-loft spunbonded web. As used herein, this signifies a web that exhibits a solidity of less than 8.0%. High-loft spunbonded webs, methods of making high-loft spunbonded webs, and methods of measuring solidity of webs, are disclosed in U.S. Pat. No. 8,162,153 to Fox, which is incorporated by reference herein in its entirety. In some embodiments, a spunbonded web may be a relofted spunbonded web. Such materials are described in U.S. Provisional Patent Application No. 62/714,188 (entitled AIR-FILTER MEDIA COMPRISING A RELOFTED SPUNBONDED WEB, AND METHODS OF MAKING AND USING, and filed on 3 Aug. 2018), which is incorporated by reference herein in its entirety for this purpose. Other such materials are described in International (PCT) Patent Application No. PCT/CN2018/098455 (entitled AIR-FILTER MEDIA INCLUDING A RELOFTED SPUNBONDED WEB, AND METHODS OF MAKING AND USING, and filed on 3 Aug. 2018), and in the resulting U.S. patent application Ser. No. 17/263,793, entitled AIR-FILTER MEDIA INCLUDING A RELOFTED SPUNBONDED WEB, AND METHODS OF MAKING AND USING), both of which are incorporated by reference herein in their entirety for this purpose. Any such media can be charged to form an electret, if desired.

The pleat height, pleat spacing, and pleat-tip radius of curvature of pleated air filter media 10 (and thus of fibrous air-filtration web 1 which provides, or is a layer of, air filter media 10) may be in any suitable range, and may be evaluated according to the descriptions in U.S. Provisional Patent Application 62/346,179 and in corresponding PCT International Publication No. WO2017/213926, both of which are incorporated by reference herein in their entirety for this purpose. In various embodiments, the pleat height of media 10 can be at least about 6, 8, 10, 12, 14, 16, 18, 20, 30, or 40 mm. In further embodiments, the pleat height may be at most about 120, 100, 80, 60 42, 32, 22, 20, 15, 12, 10, or 8 mm. In various embodiments the pleat spacing may be at most about 48, 24, 12, 10, 8, 6 or 4 mm. In further embodiments the pleat spacing may be at least about 3, 5, 7, 9 or 11 mm. In various embodiments, the radius of curvature of the pleat tips may be at most about 4.0, 3.0, 2.0, 1.8, 1.6, 1.4, 1.2, 1.0, 0.8, 0.6, 0.4, 0.3, or 0.2 mm. In further embodiments the radius of curvature of the pleat tips may be at least about 0.1, 0.15, 0.25, 0.35, 0.45, 0.5, 0.7, 0.9, 1.1, 1.3, 1.5, or 1.7 mm. It will be appreciated that pleated media with a small radius of curvature may often comprise relatively sharp-tipped, flat-walled, "zig-zag" style pleats that are distinguished from e.g. sinusoidal pleats that exhibit pleat "tips" with a large radius of curvature.

Figure 8:
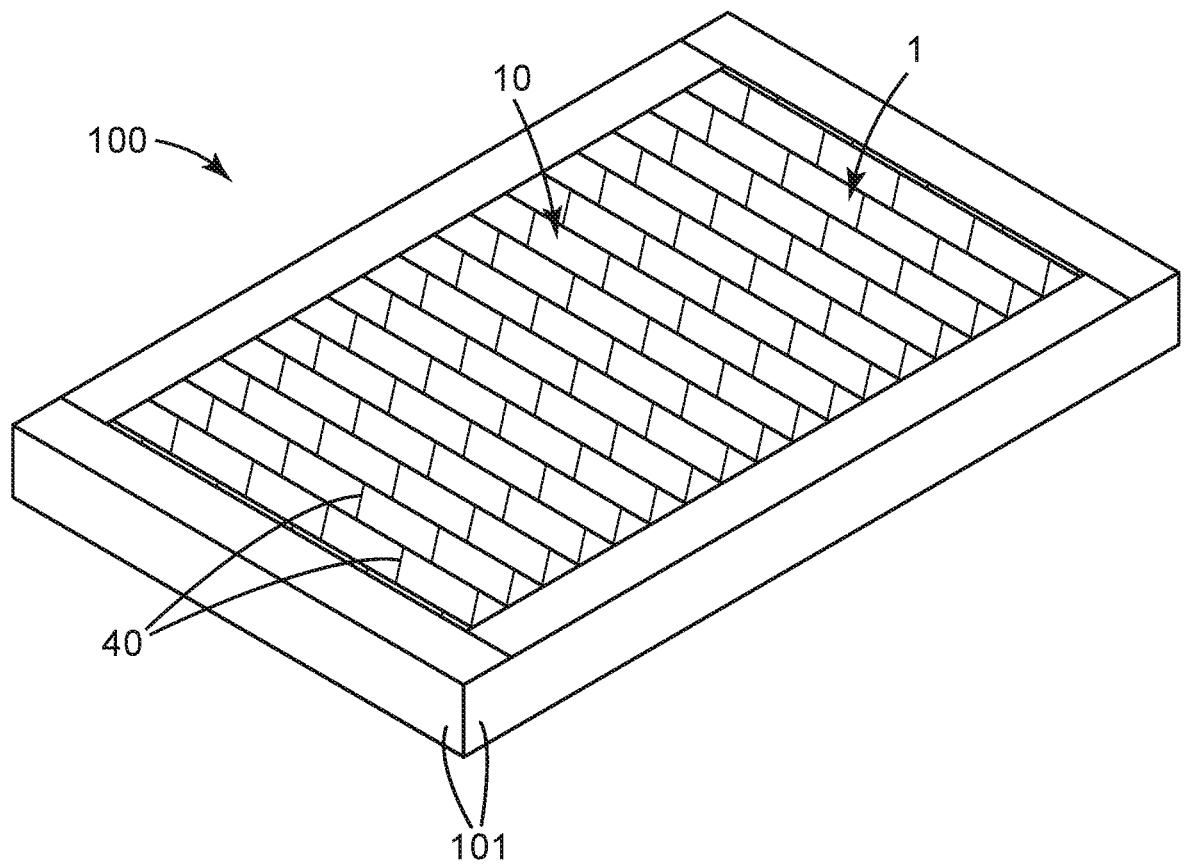
FIG. 8 is a first-side perspective view of an exemplary framed air filter comprising a pleated air filter media with continuous-contact reinforcing filaments on a first face of the pleated air filter media.

In some embodiments a pleated air filter media 10 as disclosed herein may have a perimeter support frame 101 mounted to the edges thereof e.g. as shown in FIG. 8. In some embodiments such a frame may be a channel frame. A channel frame is one in which each major portion of the frame (e.g. of the four portions that are each mounted on a major edge of the pleated air filter media) is at least substantially U-shaped in cross-section. Such channel frames are well known in the art (being described e.g. in U.S. Pat. No. 8,685,129). A frame may take the form of a single piece of material (e.g. a "box" frame) that provides all four frame portions; or it may be formed by attaching two, three, or four frame pieces (e.g., two L-shaped pieces) to each other to form the finished frame. In particular embodiments, a channel frame (e.g. a box frame) may comprise one or more downstream support members (that may collectively form a downstream support grill e.g. of the general type disclosed in U.S. Pat. No. 8,685,129) that provide downstream support. In other embodiments a perimeter support frame may be a pinch frame (e.g. of the general type disclosed in U.S. Pat. No. 9,174,159). A frame 101 can be made of any suitable material, e.g. molded plastic, chipboard, and so on.

Pleated fibrous air-filtration web 1, hence pleated air filter media 10, may be used as an air filter 100 or as a layer or component of a multilayer air filter 100 in any suitable environment or situation in which moving air, e.g. motivated by a mechanized fan or blower system, is desired to be filtered. Such an air filter 100 may find use e.g. in any air-handling system, including for example HVAC (heating-ventilating-air-conditioning) systems, room air purifiers, automotive engine or cabin-air filtration applications, and so on. In particular embodiments, filter 100 is configured for use in forced-air HVAC systems.

The term "upstream" is used to denote the side of an air filter from which moving air (e.g. in an HVAC system) impinges on the filter media. The term "downstream" is used to denote the side of an air filter through which air exits the filter media. Pleated filters are often marked (or otherwise designated) by the manufacturer to identify upstream and downstream sides in order that the filter be installed in the proper orientation in an HVAC system; thus, the terms upstream and downstream can serve to differentiate the two sides of a pleated filter even if the filter has not yet been positioned in an HVAC system. In particular embodiments, an air filter 100 that comprises pleated air filter media 10 as disclosed herein, may be configured so that the first side 2 of the air filter (the side comprising reinforcing filaments 40) is the downstream side of the air filter. This may provide that the force of the moving air holds the fibrous web 1 against filaments 40 rather than acting to separate web 1 from filaments 40, which may be advantageous in some instances. However, as long as filaments 40 are well-bonded to web 1, air filter 100 may be configured so that the first side 2 of the air filter is the upstream side of the air filter. As noted, in some embodiments reinforcing filaments 40 may be present on both the upstream and downstream sides of the air filter.

LIST OF EXEMPLARY EMBODIMENTS

Embodiment 1 is a pleated air filter media comprising: a fibrous air-filtration web with a first side with a first face and second, oppositely-facing side with a second face and wherein the fibrous air-filtration web comprises a plurality of oppositely-facing pleats with a pleat direction and with a plurality of first-side pleat tips and first-side pleat valleys and second-side pleat tips and second-side pleat valleys, wherein the fibrous air-filtration web comprises a plurality of continuous-contact reinforcing filaments that are melt-bonded to the first face of the first side of the fibrous air-filtration web, and, wherein at least some of the continuous-contact reinforcing filaments each comprise a plurality of locally-thinned bending zones spaced along a folding direction of the fibrous air-filtration web, each locally-thinned bending zone being registered with a first-side pleat tip or a first-side pleat valley of the first side of the fibrous air-filtration web.

Embodiment 2 is the pleated air filter media of embodiment 1 wherein successive, nearest-neighbor locally-thinned bending zones are registered with successive, nearest-neighbor first-side pleat tips and first-side pleat valleys.

Embodiment 3 is the pleated air filter of any of embodiments 1-2 wherein the continuous-contact reinforcing filaments are at least substantially parallel to each other and are spaced along the pleat direction and are oriented so that a long axis of each continuous-contact reinforcing filament is at least substantially orthogonal to the pleat direction.

Embodiment 4 is the pleated air filter media of any of embodiments 1-3 wherein the continuous-contact reinforcing filaments are at least essentially parallel to each other and comprise a center-to-center spacing between nearest-neighbor filaments of from about 2 mm to about 30 mm.

Embodiment 5 is the pleated air filter media of any of embodiments 1-4 wherein the locally-thinned bending zones of the plurality of bending zones are uniformly spaced along the folding direction of the fibrous air-filtration web.

Embodiment 6 is the pleated air filter media of any of embodiments 1-5 wherein the fibrous air-filtration web comprises a pleat height of at least about 20 mm.

Embodiment 7 is the pleated air filter media of any of embodiments 1-6 wherein the fibrous air-filtration web comprises a pleat height of at least about 80 mm.

Embodiment 8 is the pleated air filter media of any of embodiments 1-7 wherein locally-thinned bending zones of different continuous-contact reinforcing filaments are spaced along an at least substantially linear path that is aligned with the pleat direction of the fibrous air-filtration web so that the locally-thinned bending zones collectively establish folding lines that are aligned with the pleat direction and along which the fibrous air-filtration web is folded to form pleat tips and pleat valleys.

Embodiment 9 is the pleated air-filter media of any of embodiments 1-8 wherein at least some of the locally-thinned bending zones exhibit a thinning ratio that is less than 0.3.

Embodiment 10 is the pleated air-filter media of any of embodiments 1-9 wherein at least some of the locally-thinned bending zones exhibit a transverse spreading ratio of greater than 1.4.

Embodiment 11 is the pleated air filter media of any of embodiments 1-10 wherein the fibrous air-filtration web exhibits elongate depressions that are aligned with the folding lines.

Embodiment 12 is the pleated air filter media of any of embodiments 1-11 wherein the fibrous air-filtration web comprises a nonwoven web comprising organic polymeric fibers at least some of which are of a composition that comprises electrets.

Embodiment 13 is the pleated air filter media of any of embodiments 1-12 wherein the reinforcing filaments are extrusion-bonded to the first face of the first side of the fibrous air-filtration web.

Embodiment 14 is the pleated air filter media of any of embodiments 1-13 wherein the locally-thinned bending zones are bidirectionally bendable.

Embodiment 15 is an air filter comprising the pleated air-filter media of any of embodiments 1-14.

Embodiment 16 is the air filter of embodiment 15 wherein the air filter is configured so that the first side of the pleated air filter media is a downstream side of the air filter.

Embodiment 17 is the air filter of any of embodiments 15-16 wherein a perimeter support frame is mounted to four major edges of the pleated air-filter media so that the air filter is a framed air filter.

Embodiment 18 is a method of filtering air, the method comprising: positioning the air filter of any of embodiments 15-17 in an air-handling system; and, operating the air-handling system so that moving air is motivated through the pleated air-filter media so as to filter the air motivated therethrough.

Embodiment 19 is a method of filtering air, the method comprising positioning an air filter comprising the pleated air-filter media of any of embodiments 1-14 in an air-handling system; and, operating the air-handling system so that moving air is motivated through the pleated air-filter media so as to filter the air motivated therethrough.

Embodiment 20 is a method of making a pleated air filter media, the method comprising: forming a plurality of molten streams of organic polymeric material and partially solidifying the molten streams into a plurality of parallel, spaced-apart, elongate, partially-solidified filaments; bringing the partially-solidified filaments into contact with a first face of a moving, flat, fibrous air-filtration web so that the partially-solidified filaments are in continuous contact with the first face of the fibrous air-filtration web; applying a force at selected locations along the elongate lengths of each of the partially-solidified filaments to locally deform the partially-solidified filaments at the selected locations to form locally-thinned zones that are spaced along the elongate lengths of the partially-solidified filaments; allowing the partially-solidified filaments to solidify into reinforcing filaments that are bonded to the first face of the fibrous air-filtration web; then, gathering the fibrous air-filtration web so that the fibrous air-filtration web is folded along folding lines collectively established by the locally-thinned zones of the reinforcing filaments, to form a pleated air filter media.

Embodiment 21 is the method of embodiment 20, wherein the method comprises extruding the plurality of molten streams onto a surface of a chill roll to form partially-solidified filaments and wherein the method also comprises bringing the fibrous air-filtration web into a nip between the chill roll and tips of a tooling roll so that the tips of the tooling roll impinge on a second face of the fibrous air-filtration web to apply the force at selected locations along the elongate lengths of each of the partially-solidified filaments.

Embodiment 22 is the method of any of embodiments 20-21 with the proviso that the method does not include a step of pre-scoring the flat fibrous air-filtration web before bringing the partially-solidified filaments into contact with the first face of the flat fibrous air-filtration web.

Examples

A nonwoven fibrous web was obtained of the general type described in U.S. Pat. No. 8,162,153, and having a basis weight of approximately 65 grams per square meter. The web was in flat-web (unpleated) form. The web was relatively soft and limp and had not been pre-scored; it was considered that the web was not pleatable (that is, it would not hold a pleated configuration in the absence of external support) in its as-received form. The web was processed using an apparatus of the general type depicted in FIG. 4. The apparatus comprised a temperature-controllable steel-faced backing roll and a ridged tooling roll. The backing roll had a diameter of 12 inches and the tooling roll had a diameter of 10 inches; both rolls were approximately 30 inches wide. The ridges each comprised a long axis oriented across the transverse width of the tooling roll. The ridges of the tooling roll were spaced (from ridge-tip to ridge-tip, with valleys therebetween) at an approximately 1 inch spacing, circumferentially around the roll.

Because it was desired to impart locally-thinned bending zones that were spaced approximately 4 inches apart, inserts were made that were inserted into every fourth valley of the tooling roll. The inserts were made via 3-D printing using an Objet CONNEX 500 printer (available from Stratasys; Eden Prairie, MN) working with Polyjet Vera White material. Each insert was elongate (with a length of approximately 30 inches to match the tooling roll) and comprised an elongate, triangular portion that could be snugly fitted into the tooling valley, and comprised a radially-outward-facing flat portion comprising an elongate ridge extending therefrom. Each ridge was approximately 160 mils wide at its base and protruded approximately 50 mils above the flat portion of the insert and comprised a tip with a radius of curvature of approximately 25 mils. The inserts were held in place in the valleys of the tooling roll by the use of filament tape that was wrapped circumferentially around the transverse ends of the tooling roll. The modified tooling roll, outfitted with inserts as described, could thus be used as a proxy for a tooling roll with 4-inch ridge-tip spacings as made.

Polypropylene (obtained from Total Petrochemicals under the trade designation M3766) was extruded using conventional extrusion equipment. A die was used that comprised roughly 48 orifices, at a spacing of approximately ½ inch, so as to provide 48 molten streams covering a span of approximately 24 inches. The molten polypropylene streams were extruded onto the face of the backing roll, which was controlled to a set point of approximately 60° F. The backing roll was nipped against the modified tooling roll (at a pressure of approximately 94 pli) and the fibrous web was fed into the nip after a short wrap on the modified tooling roll.

As the backing roll and the modified tooling roll counter-rotated, the fibrous web was carried into the nip, while resting on the tips of the inserts of the modified tooling roll. The molten polypropylene streams were carried into the nip while resting on the surface of the backing roll, partially solidifying during their journey. As the partially solidified filaments and the fibrous nonwoven web approached the nip, the front face of the fibrous web came into contact with the partially solidified filaments. In the nip, the tips of the insert ridges pressed against the rear face of the fibrous web, thus locally pinching the web and the partially solidified filaments between the insert ridge-tip and the face of the backing roll. This caused local deformation of the partially solidified filaments. After passing through the nip, the fibrous web bearing the partially solidified filaments continued in contact with the backing roll around a wrap angle of approximately 180 degrees. At this point the filaments were substantially solidified (and were well bonded to the fibrous web) and the web could be removed from the process and handled as desired.

This treatment resulted in a fibrous web bearing reinforcing filaments with locally-thinned bending zones. Optical photographs of thus-produced Working Example samples are presented in FIGS. 2 and 3. Qualitative visual inspection indicated that the bending zones comprised a thinning ratio of less than 0.3 (it was believed that the actual value was considerably lower than that) and a transverse spreading ratio of at least 1.5. Slight depressions (indentations) were visible in the web in some areas between the reinforcing filaments. It was noted that some of the reinforcing filaments that had been processed in the above-described manner, comprised locally-thinned bending zones that were flanked (along the long axis of the reinforcing filament) by zones that appeared to have been partially thinned and widened. It was believed that this resulted from the above-described inserts having ridge-tips that protruded insufficiently far outward from the flat areas of the inserts. Thus in some instances the flat areas of the inserts (immediately adjacent the ridges) apparently contacted the partially solidified filaments causing slight flattening of zones immediately adjacent the locally-thinned bending zones. This was considered to be an artifact of the modified tooling roll that was used, and did not detract from the ability of the web to be pleated.

Lengths of the 24 inch wide fibrous web bearing reinforcing filaments with bending zones as described above were gathered by hand. It was found that when gathering force was applied to the web, the web easily and controllably accordionized into a pleated configuration. No obvious differences were observed in the ability of some bending zones to bend in one direction at the pleat tips, and the ability of other bending zones to bend in the other direction at the pleat valleys. The lengths were fully compressed (accordionized) for a period of time and then were slightly expanded to their final pleat spacing for loading into a filter-making fixture. Owing to the large spacing of the bending zones (4 inches), the resulting pleated media was a "deep-pleated" media with a pleat height in the general range of 4 inches and a pleat spacing in the general range of 1 inch. The pleat tips and valleys were rather sharp (qualitative visual inspection indicated that the pleat tips comprised a radius of curvature of approximately 1 mm or less). The filament-bearing pleat walls between the pleat tips and valleys were satisfactorily stiff (and were much stiffer than the as-received fibrous web, in the absence of the reinforcing filaments). The pleated media, after being loaded into the filter-making fixture, was readily able to be framed into a conventional box frame to produce a framed air filter of nominal dimension 20×25×4 inches.

It will be apparent to those skilled in the art that the specific exemplary elements, structures, features, details, configurations, etc., that are disclosed herein can be modified and/or combined in numerous embodiments. All such variations and combinations are contemplated by the inventor as being within the bounds of the conceived invention, not merely those representative designs that were chosen to serve as exemplary illustrations. Thus, the scope of the present invention should not be limited to the specific illustrative structures described herein, but rather extends at least to the structures described by the language of the claims, and the equivalents of those structures. Any of the elements that are positively recited in this specification as alternatives may be explicitly included in the claims or excluded from the claims, in any combination as desired. Any of the elements or combinations of elements that are recited in this specification in open-ended language (e.g., comprise and derivatives thereof), are considered to additionally be recited in closed-ended language (e.g., consist and derivatives thereof) and in partially closed-ended language (e.g., consist essentially, and derivatives thereof). To the extent that there is any conflict or discrepancy between this specification as written and the disclosure in any document incorporated by reference herein, this specification as written will control.

What is claimed is:

1. A pleated air filter comprising a pleated air filter media comprising:
    a fibrous air-filtration web with a first side with a first face and second, oppositely-facing side with a second face and wherein the fibrous air-filtration web comprises a plurality of oppositely-facing pleats with a pleat direction and with a plurality of first-side pleat tips and first-side pleat valleys and second-side pleat tips and second-side pleat valleys,
        wherein the fibrous air-filtration web comprises a plurality of continuous-contact reinforcing filaments that are melt-bonded to the first face of the first side of the fibrous air-filtration web,
            wherein at least some of the continuous-contact reinforcing filaments each comprise a plurality of locally-thinned bending zones spaced along a folding direction of the fibrous air-filtration web, each locally-thinned bending zone being registered with a first-side pleat tip or a first-side pleat valley of the first side of the fibrous air-filtration web,
            wherein a collective stiffness of the continuous-contact reinforcing filaments is higher than a stiffness of the fibrous air-filtration web, and a stiffness of the locally-thinned bending zones of the continuous-contact reinforcing filaments is lower than a stiffness of portions of the continuous-contact reinforcing filaments that are not locally thinned, so that the locally-thinned bending zones of the continuous-contact reinforcing filaments cause the continuous-contact reinforcing filaments to be preferentially folded at the locally-thinned bending zones thus causing the fibrous air-filtration web to be preferentially folded at the first-side pleat tips and the first-side pleat valleys so that the fibrous air-filtration web is a pleated web,
        and wherein a perimeter support frame is mounted to four major edges of the pleated air filter media so that the pleated air filter is a framed air filter that is rectangular and that exhibits an overall major plane.

2. The pleated air filter of claim 1 wherein successive, nearest-neighbor locally-thinned bending zones are registered with successive, nearest-neighbor first-side pleat tips and first-side pleat valleys.

3. The pleated air filter of claim 1 wherein the continuous-contact reinforcing filaments are at least substantially parallel to each other and are spaced along the pleat direction and are oriented so that a long axis of each continuous-contact reinforcing filament is at least substantially orthogonal to the pleat direction.

4. The pleated air filter of claim 1 wherein the continuous-contact reinforcing filaments are at least essentially parallel to each other and comprise a center-to-center spacing between nearest-neighbor filaments of from 2 mm to 30 mm.

5. The pleated air filter of claim 1 wherein the locally-thinned bending zones of the plurality of bending zones are uniformly spaced along the folding direction of the fibrous air-filtration web.

6. The pleated air filter of claim 1 wherein the fibrous air-filtration web comprises a pleat height of at least 20 mm.

7. The pleated air filter of claim 1 wherein the fibrous air-filtration web comprises a pleat height of at least 80 mm.

8. The pleated air filter of claim 1 wherein locally-thinned bending zones of different continuous-contact reinforcing filaments are spaced along an at least substantially linear path that is aligned with the pleat direction of the fibrous air-filtration web so that the locally-thinned bending zones collectively establish folding lines that are aligned with the pleat direction and along which the fibrous air-filtration web is folded to form pleat tips and pleat valleys.

9. The pleated air-filter of claim 1 wherein at least some of the locally-thinned bending zones exhibit a thinning ratio that is less than 0.3.

10. The pleated air-filter of claim 1 wherein at least some of the locally-thinned bending zones exhibit a transverse spreading ratio of greater than 1.4.

11. The pleated air filter of claim 1 wherein the fibrous air-filtration web exhibits elongate depressions that are aligned with first-side pleat tips or first-side pleat valleys of the first side of the fibrous air-filtration web.

12. The pleated air filter of claim 1 wherein the fibrous air-filtration web comprises a nonwoven web comprising organic polymeric fibers at least some of which are of a composition that comprises electrets.

13. The pleated air filter of claim 1 wherein the reinforcing filaments are extrusion-bonded to the first face of the first side of the fibrous air-filtration web.

14. The pleated air filter of claim 1 wherein the locally-thinned bending zones are bidirectionally bendable.

15. The pleated air filter of claim 1 wherein the air filter is configured so that the first side of the pleated air filter is a downstream side of the air filter.

16. A method of filtering air, the method comprising:
positioning the pleated air filter of claim 1 in an air-handling system; and, operating the air-handling system so that moving air is motivated through the pleated air-filter so as to filter the air motivated therethrough.

17. A method of making a framed pleated air filter, the method comprising:
forming a plurality of molten streams of organic polymeric material and partially solidifying the molten streams into a plurality of parallel, spaced-apart, elongate, partially-solidified filaments;
bringing the partially-solidified filaments into contact with a first face of a moving, flat, fibrous air-filtration web so that the partially-solidified filaments are in continuous contact with the first face of the fibrous air-filtration web;
applying a force at selected locations along the elongate lengths of each of the partially-solidified filaments to locally deform the partially-solidified filaments at the selected locations to form locally-thinned zones that are spaced along the elongate lengths of the partially-solidified filaments;
then,
allowing the partially-solidified filaments to solidify into continuous-contact reinforcing filaments that are bonded to the first face of the moving, flat, fibrous air-filtration web;
wherein a collective stiffness of the continuous-contact reinforcing filaments is higher than a stiffness of the moving, flat, fibrous air-filtration web, and a stiffness of the locally-thinned bending zones of the continuous-contact reinforcing filaments is lower than a stiffness of portions of the continuous-contact reinforcing filaments that are not locally thinned, so that the locally-thinned bending zones of the continuous-contact reinforcing filaments collectively provide preferential folding lines of the continuous-contact reinforcing filaments which cause the fibrous air-filtration web to exhibit preferential folding lines that are aligned with the preferential folding lines of the continuous-contact reinforcing filaments,
then,
gathering the moving, flat, fibrous air-filtration web so that the fibrous air-filtration web is folded along the preferential folding lines collectively established by the locally-thinned zones of the reinforcing filaments, to form a pleated air filter,
then,
mounting a perimeter frame on four major edges of the pleated air filter to form a framed pleated air filter that is rectangular and that exhibits an overall major plane.

18. The method of claim 17, wherein the method comprises extruding the plurality of molten streams onto a surface of a chill roll to form partially-solidified filaments and wherein the method also comprises bringing the fibrous air-filtration web into a nip between the chill roll and tips of a tooling roll so that the tips of the tooling roll impinge on a second face of the fibrous air-filtration web to apply the force at selected locations along the elongate lengths of each of the partially-solidified filaments.

19. The method of claim 17 with the proviso that the method does not include a step of pre-scoring the flat fibrous air-filtration web before bringing the partially-solidified filaments into contact with the first face of the flat fibrous air-filtration web.

* * * * *